(12) United States Patent
Hiruma

(10) Patent No.: US 7,195,822 B2
(45) Date of Patent: Mar. 27, 2007

(54) HEAT-SHRINKABLE FILM OF POLYLACTIC ACID FILM

(75) Inventor: Takashi Hiruma, Nagahama (JP)

(73) Assignee: Mitsubishi Plastics, Inc., Tokyo (JP)

( * ) Notice: Subject to any disclaimer, the term of this patent is extended or adjusted under 35 U.S.C. 154(b) by 0 days.

(21) Appl. No.: 10/508,706

(22) PCT Filed: Mar. 31, 2003

(86) PCT No.: PCT/JP03/04093

§ 371 (c)(1),
(2), (4) Date: Sep. 30, 2004

(87) PCT Pub. No.: WO03/082981

PCT Pub. Date: Oct. 9, 2003

(65) Prior Publication Data

US 2005/0227099 A1 Oct. 13, 2005

(30) Foreign Application Priority Data

Apr. 2, 2002 (JP) .............................. 2002-099541

(51) Int. Cl.
- B32B 27/06 (2006.01)
- B32B 27/08 (2006.01)
- B32B 24/18 (2006.01)
- B32B 27/36 (2006.01)
- C08L 67/02 (2006.01)

(52) U.S. Cl. .................... 428/480; 428/34.9; 428/35.1; 428/213; 428/215; 428/339; 428/910; 525/437; 525/444

(58) Field of Classification Search .................... None
See application file for complete search history.

(56) References Cited

U.S. PATENT DOCUMENTS

| 5,403,897 | A | * | 4/1995 | Ebato et al. ................. 525/444 |
| 5,726,220 | A | * | 3/1998 | Tokushige et al. .......... 523/125 |
| 5,866,634 | A | * | 2/1999 | Tokushige et al. .......... 523/124 |
| 6,787,613 | B2 | * | 9/2004 | Bastioli et al. .............. 525/411 |
| 6,841,597 | B2 | * | 1/2005 | Bastioli et al. ................ 524/47 |
| 2002/0094444 | A1 | * | 7/2002 | Nakata et al. ............... 428/480 |
| 2002/0136848 | A1 | * | 9/2002 | Yoshii et al. ............... 428/35.7 |
| 2002/0151618 | A1 | * | 10/2002 | Bastioli et al. .............. 523/124 |
| 2002/0188071 | A1 | * | 12/2002 | Bastioli et al. .............. 525/165 |

FOREIGN PATENT DOCUMENTS

| EP | 1227129 | | 7/2002 |
| JP | 9-111107 | | 4/1997 |
| JP | 09-111107 | * | 4/1997 |
| JP | 09169896 | | 6/1997 |
| JP | 2000-281818 | | 10/2000 |
| JP | 2000281818 | | 10/2000 |
| JP | 2001011214 | | 1/2001 |
| JP | 2001047583 | | 2/2001 |
| JP | 2001-146523 | * | 5/2001 |
| JP | 2001151906 | | 6/2001 |
| JP | 2001151907 | | 6/2001 |
| WO | 02/059199 | | 8/2002 |

* cited by examiner

Primary Examiner—Vivian Chen
(74) Attorney, Agent, or Firm—Armstrong, Kratz, Quintos, Hanson & Brooks, LLP

(57) ABSTRACT

The heat shrinkable film of polylactic acid-based resin used for shrink packaging, shrink bundling, shrink label and the like, can prevent shrinking in the machinery direction after stretching and can show a good appearance after shrinking. The heat shrinkable film of polylactic acid-based resin comprises at least one layer formed by using mainly a resin composition which contains polylactic acid-based resin and aliphatic polyester "A" having a melting point of 100 to 170° C. and a glass transition temperature of 0° C. or less, in which the heat shrinkable film of polylactic acid-based resin is stretched in at least one direction.

21 Claims, No Drawings

HEAT-SHRINKABLE FILM OF POLYLACTIC ACID FILM

CROSS REFERENCE TO RELATED APPLICATION

This application is the U.S. national stage of International Application No. PCT/JP03/04093, filed Mar. 31, 2003, which was published under PCT Article 21(2) as Publication No. WO03/082981 and of which the instant application claims the benefit, which in turn claims the benefit of Japan Patent Application No. 2002-099541, filed Apr. 2, 2002. All these applications are incorporated herein by reference in their entirely.

FIELD OF THE INVENTION

The present invention relates to a film of polylactic acid-based resins, and more specifically a film of polylactic acid-based resins used for shrink packaging, shrink bundling, shrink label and the like.

BACKGROUND OF THE INVENTION

For heat shrinkable films used for shrink packaging, shrink bundling and shrink label, for example, polyvinyl chloride (PVC), styrene-butadiene block copolymer (SBS), or polyester based resin have been used. Usually, a heat shrinkable film made of such plastic materials is supposed to be disposed of together with a product packaged by the heat shrinkable film after use of the product, in which case the heat shrinkable film poses a difficulty in incineration disposal or landfill disposal thereof. For instance, polyvinyl chloride discharges harmful gas during incineration disposal thereof. In case of landfill disposal, such plastic materials having high chemical stability are hardly biodegraded by the natural environment so that they may remain underground semipermanently. Thus, the disposal capacity of garbage landfilling facilities is reached in a short period of time. Further, when such plastic materials are disposed of in the natural environment, the scenery or the living environment of marine and other creatures are destroyed.

Consequentially, from a viewpoint of environmental protection, biodegradable materials have been much studied and developed in recent years. Polylactic acid, one of such biodegradable materials, is naturally hydrolyzed in soil or in water and harmlessly degraded by microorganisms. And, due to the low calorific value of combustion thereof, a combustor will not be damaged in the case of incineration disposal. Also, since the starting material of polylactic acid is derived from plant, it is not necessary to depend on oil which is an exhaustible resource.

For instance, a heat shrinkable film made of polylactic acid has been disclosed in Japanese Patent Application Publication No. Hei 5-212790. However, the disclosed heat shrinkable film has a high shrinkable temperature of 140 to 150° C. so that it cannot be used for other than a limited use.

In addition, a sheet or a film made of polylactic acid does not have a sufficient enough strength to put in practical use due to brittleness inherent to polylactic acid. Especially, a polylactic acid shrinkable film which is uniaxially stretched in remains brittle in unstretched directions, whereby it is easily cracked when impacted in the unstretched directions. Consequentially, in order to provide a breaking resistance to polylactic acid, it has been studied to blend polylactic acid-based resins with aliphatic polyester.

However, when a film made of polylactic acid-based resins blended with aliphatic polyester is stretched in a uniaxial direction, shrinkage in unstretched directions occurs. For instance, a heat shrinkable label, which used for a PET bottle, made of a film transversely-stretched shrinks not only in the transverse direction but also in a perpendicular direction (machinery direction) to the transverse direction (hereinafter referred to a longitudinal shrinkage), resulting in a bad appearance of the label. Therefore, a heat shrinkable film of polylactic acid-based resins stretched in a uniaxial direction and capable of preventing shrinkage in unstretched directions has been expected.

SUMMARY OF THE INVENTION

In view of the above situation, an object of the present invention is to provide a heat shrinkable film of polylactic acid-based resins having biodegradability and a good appearance after shrinkage.

A heat shrinkable film of polylactic acid-based resin of the present invention has at least one layer and is stretched in at least one direction, wherein said layer contains mainly a resin composition which contains polylactic acid-based resin and aliphatic polyester "A" having a melting point of 100° C. to 170° C. and a glass transition temperature of 0° C. or less.

In the present invention, the resin composition may further contain aliphatic polyester "B" having a melting point of 50° C. to 100° C.

Further, the resin composition may contain 50 to 90% by mass of polylactic acid-based resin having a proportion in mass ratio of D-lactic acid to L-lactic acid within the range from 98:2 to 85:15, or from 2:98 to 15:85, and 10 to 40% by mass of the aliphatic polyester "A".

Further, the heat shrinkable film of polylactic-acid based resin may have an intermediate layer containing mainly a resin composition and at least one outer layer containing 90% by mass or more of polylactic-acid.

DETAILED DESCRIPTION OF EMBODIMENT OF THE INVENTION

Hereinafter, the present invention will be described in detail.

A heat shrinkable film of polylactic acid-based resins of the present invention has at least one layer formed by using mainly a mixture which consists of polylactic acid-based resins and aliphatic polyester resins (hereinafter, sometimes referred to also as "aliphatic polyester A") having a melting point of 100° C. to 170° C. and a glass transition temperature of 0° C. or less.

The polylactic acid-based resins used in the present invention include poly(L-lactic acid) whose structural unit is L-lactic acid, poly(D-lactic acid) whose structural unit is D-lactic acid, poly(DL-lactic acid) whose structural unit includes L-lactic acid and D-lactic acid, and mixtures thereof. The polylactic acid-based resins may be copolymers with the other hydroxycarboxylic acids as shown below, and may have a small amount of residue of chain extender.

Preferably, the polylactic acid-based resins have a composition such that a ratio of the mass of D-form to the mass of L-form, i.e., D-lactic acid: L-lactic acid=98:2 to 85:15, or 2:98 to 15:85.

The polylactic acid-based resins having a DL composition such that D-lactic acid: L-lactic acid=100:0 or 0:100 have very high crystallinity, heat resistance and good mechanical property. However, when a film obtained by such the polylactic acid-based resins is stretched for forming a heat shrinkable film, the degree of crystallization increases by stretching orientation so that it is difficult to control a degree of heat shrinkage. Even if an amorphous film is obtained, heat added when shrinking will make the crystallization progress, resulting in a failure of appearance after the shrinking. Accordingly, in order to obtain a heat shrinkable film by using polylactic acid-based resins, it is preferable to lower the crystallinity thereof to an appropriate degree. When a copolymer of D-lactic acid and L-lactic acid is used, it is generally known that the degree of crystallization decreases as a ratio of optical isomer therein increases. Accordingly, the ratio of optical isomer is adjusted so as to lower the crystallinity appropriately. For the purpose of adjusting the ratio of optical isomer, two or more kinds of polylactic acid each having a different proportion of D-lactic acid to L-lactic acid may be blended.

Examples of the other hydroxycarboxylic acid unit to be copolymerized in the polylactic-acid include bifunctional aliphatic hydroxycarboxylic acids such as optical isomers of lactic acid (D-lactic acid for L-lactic acid, L-lactic acid for D-lactic acid), glycolic acid, 3-hydroxybutyric acid, 4-hydroxybutyric acid, 2-hydroxy-n-butyric acid, 2-hydroxy-3, 3-dimethylbutyric acid, 2-hydroxy-3-methylbutyric acid, 2-methyllactic acid, and 2-hydroxycaproic acid, and lactones such as caprolactone, butyrolactone, and valerolactone.

Any one of known methods such as a condensation polymerization method and a ring opening polymerization method may be adopted as the polymerization method for lactic acid-based resins. For example, in the condensation polymerization method, L-lactic acid or D-lactic acid or a mixture of these is directly polymerized by condensation with dehydration to obtain a lactic acid-based resin with a desired composition.

In the ring opening polymerization method (lactide method), lactide, which is a cyclic dimer of lactic acid, is polymerized in the presence of a selected catalyst, optionally using a polymerization regulator to obtain polylactic acid-based resins.

The polylactic acid-based resins used in the present invention preferably have a weight-average molecular weight of 60,000 to 700,000, more preferably 80,000 to 400,000, and especially preferably 100,000 to 300,000. When the weight average molecular weight is below 60,000, the resin shows substantially no useful properties such as physical properties, heat resistance and soon; while if the weight average molecular weight is above 700,000, the resin sometimes has too high a melt viscosity to be suitably molded.

Next, aliphatic polyester will be explained.

In the present invention, aliphatic polyester is the aliphatic polyesters obtained by condensation of aliphatic dicarboxylic acids or derivative thereof with aliphatic polyhydric alcohols, and preferably has biodegradability.

Examples of the aliphatic dicarboxylic acid component used for forming aliphatic polyester include succinic acid, adipic acid, suberic acid, sebacic acid and dodecanedioic acid, etc. Examples of the aliphatic polyhydric alcohol include aliphatic diols such as ethylene glycol, 1,4-butanediol, and 1,4-cyclohexanedimethanol, etc. In the present invention, succinic acid and adipic acid are preferred in these aliphatic dicarboxylic acid components, and 1,4-butanediol is preferred in these aliphatic polyhydric alcohol components.

The aliphatic polyester "A", having a melting point within the range of 100° C. to 170° C., is preferably biodegradable and additionally has a melting point within the range of 100° C. to 140° C. When an aliphatic polyester "A" has a melting point less than 100° C., the aliphatic polyester "A" begins to melt when heat shrinking, resulting in increase of the degree of heat shrinkage in the machinery direction. On the other hand, when an aliphatic polyester "A" has a melting point of 100° C. or more, a longitudinal shrinkage (a shrinkage in the machinery direction) can be prevented because the aliphatic polyester "A" remains in a crystalline state and acts as a pillar in the temperature range at which steam shrinker is conventionally carried out, in other words, in the temperature range of 60° C. to 100° C. at which a film obtained by using polylactic acid-based resins can heat-shrink.

Since a melting point of polylactic acid-based resins, which varies depending on the proportion in mass ratio of D-lactic acid to L-lactic acid, is typically around 170° C., in order to suppress thermal decomposition when extruding, it is required to set an extrusion temperature to the range of about 170° C. to about 200° C. If aliphatic polyester "A" has a melting point of 170° C. or more, the resin composition containing polylactic acid-based resins and the aliphatic polyester "A" cannot be melted sufficiently upon extrusion molding.

The aliphatic polyester "A" preferably has a glass transition temperature of 0° C. or less, and more preferably −20° C. or less in order to impart breaking resistance to the polyester. The kinds of aliphatic polyester are not particularly limited, if the polyester has a glass transition temperature of 0° C. or less; aliphatic polyester obtained by condensation of aliphatic dicarboxylic acids or derivative thereof with aliphatic polyhydric alcohols is most preferred as the aliphatic polyester "A".

Examples of the aliphatic dicarboxylic acid component used for forming the aliphatic polyester "A" and aliphatic polyester "B" to be later described include aliphatic dicarboxylic acids such as succinic acid, adipic acid, suberic acid, sebacic acid and dodecanedioic acid, etc, and anhydrides and derivatives thereof. Alternatively, examples of the aliphatic polyhydric alcohol component include aliphatic diol such as ethylene glycol, butanediol, hexanediol, octanediol, cyclopentanediol, cyclohexanediol and cyclohexanedimetanol, etc, and derivatives thereof. In the present invention, polybutylene succinate which is obtained by condensation polymerization of succinic acid as the aliphatic dicarboxylic acid component, and 1,4-butanediol as the aliphatic polyhydric alcohol component is preferred as the aliphatic polyester "A".

In a polymerization process of the aliphatic polyester "A", a small amount of chain extender, such as diisocyanate compounds, epoxy compounds, diphenyl compounds and acid anhydrides, may be added for the purpose of increasing molecular weight. In the present invention, a preferred range of the weight-average molecular weight of the aliphatic polyester "A" is 60,000 to 300,000, more preferably 90,000 to 200,000.

The aliphatic polyester "A" preferably has a melt viscosity in the range of MFR (Melt Flow Rate at 190° C.) of about 1 to about 40, more preferably about 1 to about 20. When the aliphatic polyester "A" has MFR of 40 or more, a reduction in kneading ability with polylactic acid-based resins and breaking resistance tends to occur.

In the present invention, the aliphatic polyester "A" may be a copolymer with other components; in this case, it is required that the copolymer has a melting point of 100° C. to 170° C. and a glass transition temperature of 0° C. or less. For instance, biodegradable resins such as aromatic aliphatic polyester having aromatic dicarboxylic acid component, aliphatic polyester carbonate having carbonate group (for instance, 1,4-butanediol/succinic acid copolymer having carbonate group) may be used as the other components. Additionally, copolymers of lactic acid, aliphatic dicarboxylic acid and aliphatic diol, for example, biodegradable resin such as polylactic acid butylene succianate may be used.

In the present invention, the polylactic acid-based resins and the aliphatic polyester "A" may be blended within a predetermined amount, respectively. For instance, it is preferable that 50 to 90% by mass of polylactic acid-based resins and 10 to 40% by mass of aliphatic polyester "A" in the resin composition are blended.

In the present invention, together with the polylactic acid-based resins and aliphatic polyester "A", aliphatic polyester resin (hereinafter, sometimes, referred to also as "aliphatic polyester B") having a melting point of 50° C. or more and 100° C. or less may be blended. The aliphatic polyester "B" preferably has biodegradability and includes polybutylene succianate adipate (melting point of 94° C.) and polycaprolactone (melting point of 61° C.), etc. Blending of the aliphatic polyester "B" will improve transparency and breaking resistance of a film of the polylactic acid-based resins. It is to be noted that a blending amount of the aliphatic polyester "B" is preferably 5% by mass or more and 20% by mass or less in the resin composition. That is, when the mixing amount of the aliphatic polyester "B" is 5% by mass or more, transparency and breaking resistance can be increased sufficiently. On the other hand, when the mixing amount of the aliphatic polyester "B" is 20% by mass or less, the degree of shrinkage in the machinery direction will be suppressed, resulting in a good appearance after shrinking.

And, among various types of aliphatic polyester "B" having same melting point, aliphatic polyester having a lower melt viscosity, in other words, having a higher melt flow rate (MFR), may be preferred so as to improve transparency.

In a polymerization process of the aliphatic polyester "B", a small amount of chain extender such as diisocyanate compound, epoxy compound, diphenyl compound and acid anhydride may be added so as to increase a molecular weight.

In the present invention, polybutylene succinate adipate suitably used for aliphatic polyester "B" preferably has a weight-average molecular weight of 60,000 to 300,000, more preferably 90,000 to 200,000. And, the aliphatic polyester "B" preferably has a melt viscosity such as in the range of MFR (190° C.) of 1 to 40, more preferably 1 to 20. When the aliphatic polyester "B" has MFR of above 40, a decrease in kneading ability with polylactic acid-based resins and a decrease in breaking resistance tend to occur. And, polycaprolactone preferably has a melt viscosity such as in the range of MFR (190° C.) of 1 to 20, more preferably about 1 to about 10.

In the present inventions one or more other layers may be laminated on a layer formed by using a resin composition which contains the polylactic acid-based resin and the aliphatic polyester. For instance, by laminating an outer layer containing 90% by mass or more of polylactic acid-based resin, improvement in transparency can be achieved.

Since a polylactic acid-based resin is different from an aliphatic polyester in deformation behavior upon stretching, stretching a film containing the polylactic acid-based resin and the aliphatic polyester may cause a surface roughness, resulting in a significant decrease in transparency. In this case, as the content of polylactic acid-based resin is low, surface roughness likely occurs and causes diffusion of transmitted light so that haze will increase and transparency will decrease. Since the outer layer containing 90% by mass or more of polylactic acid-based resin can prevent causing surface roughness, diffusion of transmitted light at a film surface can be prevented. A blending amount of the polylactic acid-based resin, contained in the outer layer, is preferably 90% by mass or more, more preferably 95% by mass or more, especially preferably 100% by mass. An outer layer containing less than 90% by mass of polylactic acid-based resin cannot prevent surface roughness upon film stretching and dose not act as a suitable outer layer.

The polylactic acid-based resin contained in an outer layer may be the same or not as the above-described polylactic acid-based resins contained in the resin composition, and is not limited particularly. When a heat shrinkable film of the polylactic acid-based resin is used for shrink labeling a PET bottle or a glass bottle, the bottles can be rubbed against each other after labeling. At this time, the heated films weld upon contact, resulting in easily forming holes in the films. Accordingly, the heat shrinkable film requires having suitable crystallinity in order to prevent formation of holes.

The outer layer requires having a thickness thicker than a height of the surface roughness. For instance, the thickness of the outer layer is preferably 1 μm or more, more preferably 2 μm or more. In addition, a film may have an outer layer on both surfaces thereof. In this case, each of the thickness of these outer layers may or may not be equal, and each of the compositions thereof may or may not be equal. Even then, it is preferable that these outer layers have the same thickness and the same composition as each other thereby to achieve excellent shrinkage property and curling prevention ability.

In the present invention, another layer may be laminated to some extent in which the advantages offered by the invention are not hampered.

In the present invention, to the resin composition used for forming of each of the layers of a heat shrinkable film of polylactic acid-based resins, various additives such as heat stabilizers, light stabilizers, light absorbents, lubricants, plasticizers, inorganic fillers, coloring agents, and pigments may be added for the purpose of adjusting of various properties.

Next, a manufacturing method of a heat shrinkable film of polylactic acid-based resins of the present invention will be explained. However, the present invention is not limited thereto.

A resin composition containing mainly polylactic acid-based resins and aliphatic polyester "A" and further aliphatic polyester "B" if necessary, is melted and extruded by an extruder to form a film. In an extrusion process, well-known methods such as a T-die method and a tubular method may be employed. Note, that it is necessary to set polymer melt temperatures in the extrusion process taking into consideration of degression of the molecular weight due to decomposition. The extruded resins are cooled by contacting with a cooling roll, air or water, and then re-heated by using proper means such as hot air, hot water, infrared rays, and microwave to obtain a film. Then, the film is uniaxial-stretched or biaxial-stretched by using a roll method, a tenter method and a tubular method to obtain a stretched film.

A stretching temperature may be appropriately determined depending on a composition ratio of L-form to D-form in the polylactic acid-based resins, or on the property of heat shrinkable film required for the various application, being in the range of about 70° C. to about 95° C.

A stretching magnification may be also appropriately determined depending on the composition ratio or the property required for application, preferably being appropriately determined in the range of 1.5 to 6 times in a main shrinkage direction. And, in order to realize breaking resistance, while suppressing a shrinkage proportion in the machinery direction, the stretching magnification in the machinery direction may be preferably about 1.01 to about 1.20. Here, the main shrinkage direction means a perpendicular direction to a machinery direction of a film (transverse direction of the film), and a machinery direction means the feeding direction of the film.

And, it may be determined depending on the usage of the shrink film whether the film is uniaxial-stretched or biaxial-stretched.

For instance, a heat shrinkable film of polylactic acid-based resins used for labeling a PET bottle, etc., may be preferably uniaxial-stretched in the transverse direction. Additionally, in order to prevent a shrinkage in the machinery direction completely, it is more preferable that the film is slightly stretched in the machinery direction. In such a case that breaking resistance is not sufficient enough even if aliphatic polyester "B" is added, or that it is difficult to achieve a suitable degree of shrinkage in the machinery direction and a breaking resistance in the machinery direction at the same time, slightly stretching in the machinery direction can prevent the film from being shrunk in the machinery direction. Because, by defining the melting point of the aliphatic polyester at the above-described range, it becomes possible that the shrinkage in the machinery direction is prevented while being stretched in the machinery direction.

In a heat shrinkable film of polylactic acid-based resins, a degree of shrinkage in the main shrinkage direction may be appropriately determined depending on the application of the shrinkable film. In a case of application for labeling a PET bottle and so on, a degree of shrinkage in the main shrinkage direction, after performing heat-treatment with hot water at 80° C. for 10 seconds, is preferably 30% or more. Additionally, in order to protect contents in the bottle, or, to accommodate high speed labeling process, the degree of shrinkage is more preferably 40% or more.

In the present invention, the degree of longitudinal shrinkage after treating with hot-water at 80° C. for 10 seconds is preferably 7% or less, and more preferably 5% or less. When the degree of longitudinal shrinkage is 7% or more, longitudinal shrinkage of the label occurs in significant condition, resulting in failure of appearance after shrinking. Generally, it is preferable that a degree of longitudinal shrinkage is as low as possible. But, in some cases to offset cross-crease, which is expected to occur upon shrinking, slight longitudinal shrinkage is required.

In such a case that a heat shrinkable film of polylactic acid-based resins of the present invention is a laminate film, the laminate film can be formed by co-extrusion together with the resin composition forming each of other layers. For instance, a resin composition containing mainly polylactic acid-based resin and aliphatic polyester "A" is used for forming an intermediate layer, and a resin composition containing 90% by mass or more of polylactic acid-based resin is used for forming an outer layer, and a laminate film having the intermediate layer and the outer layer was formed by performing co-extrusion.

EXAMPLES

Hereinafter, the present invention will be described by means of examples specifically, but the present invention should not be construed as being limited to these examples.

In the following examples, a machinery direction (longitudinal direction) of a film is expressed with "MD", a perpendicular direction to the machinery direction (transverse direction) is expressed with "TD."

Polylactic acid-based resins which was used for each of examples and comparative examples was prepared as follows.

[Preparation of Polylactic Acid-Based Resin I (a D-Form Content: 5.2%)]

To 90 kg of L-lactide (trade name: "PURASORB L", manufactured by PURAC Japan) and 10 kg of DL-lactide (trade name: "PURASORB DL", manufactured by PURAC Japan) was added 15 ppm of tin octylate and the mixture was placed in a 500-liter batch type polymerization tank equipped with a stirrer and a heating device. Then, while purging with nitrogen, polymerization was performed at 185° C. and a stirring rate of 100 rpm for 60 minutes. The obtained melt was fed to an extruder with twin-screw of 40-mm φ rotating in the same orientation provided with three vacuum vents manufactured by Mitsubishi Heavy Industries, Ltd. and the melt was extruded in strands at 200° C. with a vent pressure of 4 Torr while removing vapors, thus obtaining pellets of polylactic acid-based resin. The obtained polylactic acid-based resin had a weight-average molecular weight of 200,000 and an L-form content of 94.8%. The weight-average molecular weight of polylactic acid-based resin was measured by a gel-permeation chromatography using polystyrene as a standard.

[Preparation of Polylactic Acid-Based Resin II (a D-Form Content: 10.3%)]

To 80 kg of L-lactide (trade name: "PURASORB L", manufactured by PURAC Japan) and 20 kg of DL-lactide (trade name: "PURASORB DL", manufactured by PURAC Japan) was added 15 ppm of tin octylate and the mixture was placed in a 500-liter batch type polymerization tank equipped with a stirrer and a heating device. Then, while purging with nitrogen, polymerization was performed at 185° C. and a stirring rate of 100 rpm for 60 minutes. The obtained melt was fed to an extruder with twin-screw of 40-mm φ rotating in the same orientation provided with three vacuum vents manufactured by Mitsubishi Heavy Industries, Ltd. and the melt was extruded in strands at 200° C. with a vent pressure of 4 Torr while removing vapors, thus obtaining pellets of polylactic acid-based resin. The obtained polylactic acid-based resin had a weight-average molecular weight of 200,000 and an L-form content of 89.7%.

Example 1

35% by mass of the polylactic acid-based resin I, 35% by mass of the polylactic acid-based resin II and 30% by mass of polybutylene succinate (trade name: "BIONOLLE#1003", manufactured by Showa Highpolymer Co., Ltd., melting point of 114° C., glass transition temperature of −32° C.) were blended to prepare a resin composition. The obtained resin composition was melt-kneaded at 200° C. by using an extruder and extruded with a T-die, and then quenched on a casting roll at about 43° C. to obtain an unstretched sheet. The obtained unstretched sheet was stretched 1.08 times at 65° C. in the machinery direction with a roll, thereafter stretched 4 times at 73° C. in the transverse direction (i.e. in the width direction) to obtain a heat shrinkable film having a thickness of about 50 μm.

The obtained heat shrinkable film was evaluated and measured by the methods described below. The results are shown in Table 1.

(Evaluation and Measurement Method)

(1) Heat Shrinkage Rate

A film piece cut out from the obtained heat shrinkable film into a size of 100 mm in the MD and 100 mm in the TD was immersed in water in a hot water bath at 80° C. for 10 seconds, and thereafter a shrinkage amount in length of the film piece was measured. A heat shrinkage rate (%) was calculated in terms of % value of a rate of the shrinkage amount in length to the original length of the film piece before shrinking.

(2) Degree of Tensile Breaking Extension (Evaluation of the Breaking Resistance)

In accordance with JIS K-7127, the degree of tensile breaking extension in the MD direction of the film was obtained on condition that a tensile speed is 200 mm/minute and an atmosphere temperature is 23° C.

(3) Haze

In accordance with JIS K-7105, haze of the film was measured.

(4) Appearance after Shrinking

From the film, on which a grid pattern having a 10 mm spacing was printed, a film piece was cut out into a size of 100 mm in the MD direction and 298 mm in the TD direction. One end portion of the film piece in the TD direction was overlapped with 10 mm of another end portion of the film piece and these end portions are adhered by a solvent to form a cylindrical film. The cylindrical film was put on a cylindrical PET bottle having a capacity of 1.5 liter, and then the cylindrical PET bottle covered with the cylindrical film was passed through a steam-heated shrink tunnel having a length of 3.2 m (3 zones) for about 4 seconds without rotating. The temperature at each zone inside of the tunnel was adjusted within the range of 80° C. to 90° C. by controlling the amount of steam by adjusting a steam adjust valve, respectively. After the bottle was packaged by the film, the evaluation was performed according to the following standards.

Evaluation Standards:

◯: Satisfactorily shrinkage ability. No crinkling, no crater and no deformation of the grid. Good adhesion;

Δ: Satisfactorily shrinkage ability. Small crinkling, small crater and small deformation of the grid. Or, small longitudinal shrinkage. No problem in practical use;

X: Insufficient transverse shrinkage. Or, excess longitudinal shrinkage. Problem in practical use.

Example 2

35% by mass of polylactic acid-based resin 1,35% by mass of polylactic acid-based resin II and 30% by mass of polybutylene succinate (trade name: "BIONOLLE#1003", manufactured by Showa Highpolymer Co., Ltd., melting point of 114° C., glass transition temperature of –32° C.) were blended to prepare a resin composition used for forming an intermediate layer.

Then, after each of the resin composition for forming the intermediate layer and polylactic acid-based resin I for forming an outer layer was dried at a suitable temperature, respectively, each of the resin composition and the polylactic acid-based resin I was charged to extruders and melt-kneaded respectively, and then was melt-extruded at 200° C. with T-dies, at which the resins melt-extruded were joined to form a melt consisting of three layers. Then, the melt was quenched on a casting roll at about 43° C. to obtain an unstretched laminate sheet having three layers formed by using two kinds of resin compositions, i.e., an outer layer/an intermediate layer/another outer layer. The obtained unstretched laminate sheet was stretched 1.08 times at 65° C. in the machinery direction by roll stretching method, thereafter transversely stretched 4 times at 73° C. in the transverse direction by tenter stretching method to obtain a heat shrinkable film having a thickness of about 50 μm.

The heat shrinkable film thus obtained was evaluated in the same manner as in Example 1. The results are shown in Table 1.

Example 3

An unstretched laminate sheet having three layers (an outer layer/an intermediate layer/another outer layer) formed by using two kinds of resin compositions was obtained in the same manner as in Example 2 except that polybutylene succinate (BIONOLLE#1003) contained in a resin composition used for forming an intermediate layer was changed to polybutylene succinate (trade name: "BIONOLLE#1010", manufactured by Showa Highpolymer Co. Ltd., melting point of 115° C., glass transition temperature of –32° C.) The obtained unstretched laminate sheet was stretched 1.08 times at 65° C. in the machinery direction by roll stretching method, thereafter stretched 4 times at 73° C. in the transverse direction to obtain a heat shrinkable film having a thickness of about 50 μm.

The heat shrinkable film thus obtained was evaluated in the same manner as in Example 1. The results are shown in Table 1.

Example 4

An unstretched laminate sheet having three layers (an outer layer/an intermediate layer/another outer layer) formed by using two kinds of resin compositions was obtained in the same manner as in Example 2 except that 30% by mass of polybutylene succinate (BIONOLLE#1003) contained in a resin composition used for forming an intermediate layer was changed to 20% by mass of polybutylene succinate (trade name: "BIONOLLE#1003," manufactured by Showa Highpolymer Co., Ltd., melting point of 114° C., glass transition temperature of –32° C.) and 10% by mass of polycaprolactone (trade name: "Celgreen P-H7", manufactured by Daicel Chemical Industries, Ltd., melting point of 61° C., glass transition temperature of –58° C.). The obtained unstretched laminate sheet was stretched 1.08 times at 65° C. in the machinery direction by roll stretching method, thereafter stretched 4 times at 73° C. in the transverse direction to obtain a heat shrinkable film having a thickness of about 50 μm.

The heat shrinkable film thus obtained was evaluated in the same manner as in Example 1. The results are shown in Table 1.

Example 5

An unstretched laminate sheet having three layers (an outer layer/an intermediate layer/another outer layer) formed by using two kinds of resin compositions was obtained in the same manner as in Example 2 except that polybutylene succinate (BIONOLLE#1003) contained in a resin composition used for forming an intermediate layer was changed to 30% by mass of polybutylene succinate (trade name: "PBSL," manufactured by Mitsubishi Chemical Corporation, melting point of 108° C., glass transition temperature of −30° C.). The obtained unstretched laminate sheet was stretched 1.15 times at 65° C. in the machinery direction by roll stretching method, thereafter stretched 4 times at 70° C. in the transverse direction to obtain a heat shrinkable film having a thickness of about 50 μm.

The heat shrinkable film thus obtained was evaluated in the same manner as in Example 1. The results are shown in Table 1.

Example 6

An unstretched laminate sheet having three layers (an outer layer/an intermediate layer/another outer layer) formed by using two kinds of resin compositions was obtained in the same manner as in Example 2 except that 35% by mass of polylactic acid-based resin I, 35% by mass of polylactic acid-based resin II, 20% by mass of polybutylene succinate (trade name: "BIONOLLE#1003," manufactured by Showa Highpolymer Co., Ltd., melting point of 114° C., glass transition temperature of −32° C.), and 10% by mass of polybutylene succinate adipate (trade name: "BIONOLLE #3003," manufactured by Showa Highpolymer Co., Ltd., melting point of 94° C., glass transition temperature of −45° C.) were used in place of the resin composition used for forming an intermediate layer in Example 2. The obtained unstretched laminate sheet was stretched 1.08 times at 65° C. in the machinery direction by roll stretching method, thereafter stretched 4 times at 73° C. in the transverse direction to obtain a heat shrinkable film having a thickness of about 50 μm.

The heat shrinkable film thus obtained was evaluated in the same manner as in Example 1. The results are shown in Table 1.

Comparative Example 1

An unstretched laminate sheet having three layers (an outer layer/an intermediate layer/another outer layer) formed by using two kinds of resin compositions was obtained in the same manner as in Example 2 except that polybutylene succinate contained in a resin composition used for forming an intermediate layer in Example 2 was changed to 30% by mass of bionole polybutylene succinate adipate (trade name: "BIONOLLE#3003", manufactured by Showa Highpolymer Co. Ltd., melting point of 94° C., glass transition temperature of −45° C.). The obtained unstretched laminate sheet was stretched 1.08 times at 65° C. in the machinery direction by roll stretching method, thereafter stretched 4 times at 70° C. in the transverse direction to obtain a heat shrinkable film having a thickness of about 50 μm.

The heat shrinkable film thus obtained was evaluated in the same manner as in Example 1. The results are shown in Table 1.

Comparative Example 2

In the same manner as in Comparative Example 1, an unstretched laminate sheet having three layers forming by using two kinds of resin compositions was obtained. The obtained unstretched laminate sheet was stretched 1.02 times at 65° C. in the machinery direction by roll stretching method, thereafter stretched 4 times at 72° C. in the transverse direction to obtain a heat shrinkable film having a thickness of about 50 μm.

The heat shrinkable film thus obtained was evaluated in the same manner as in Example 1. The results are shown in Table 1.

Comparative Example 3

An unstretched laminate sheet having three layers (an outer layer/an intermediate layer/another outer layer) formed by using two kinds of resin compositions was obtained in the same manner as in Comparative Example 1 except that polybutylene succinate adipate contained in a resin composition used for forming an intermediate layer in Comparative Example 1 was changed to 30% by mass of the trade name of "Celgreen P-H7", manufactured by Daicel Chemical Industries, Ltd., (melting point of 61° C., glass transition temperature of −58° C.). The obtained unstretched laminate sheet was stretched 1.01 times at 65° C. in the machinery direction by roll stretching method, thereafter stretched 4 times at 71° C. in the transverse direction to obtain a heat shrinkable film having a thickness of about 50 μm.

The heat shrinkable film thus obtained was evaluated in the same manner as in Example 1. The results are shown in Table 1.

TABLE 1

| | Outer layer | | Intermediate layer (mass %) | | | | Heat shrinkage rate (%) | | Degree of tensile | | |
|---|---|---|---|---|---|---|---|---|---|---|---|
| | Stretching ratio in the machinery direction | (mass %) Polylactic acid | Polylactic acid | | Aliphatic polyester | | Hot water of 80° C. for 10 seconds | | breaking extension | Haze | Appearance after shrinking |
| | | I | I | II | A | other | MD | TD | % | % | |
| Example 1 | 1.08 | — | 35 | 35 | #1003 (30) | — | 3.6 | 50.8 | 255 | 22.8 | ○ |
| Example 2 | 1.08 | 100 | 35 | 35 | #1003 (30) | — | 3.8 | 50.5 | 204 | 6.5 | ○ |
| Example 3 | 1.08 | 100 | 35 | 35 | #1010 (30) | — | 4.0 | 49.7 | 134 | 5.7 | ○ |
| Example 4 | 1.08 | 100 | 35 | 35 | #1003 (20) | P-H7 (10) | 5.0 | 47.2 | 413 | 5.4 | ○ |
| Example 5 | 1.15 | 100 | 35 | 35 | PBSL (30) | — | 4.8 | 40.5 | 304 | 10.5 | ○ |
| Example 6 | 1.08 | 100 | 35 | 35 | #1003 (20) | #3003 (10) | 5.1 | 49.5 | 301 | 5.8 | ○ |
| Comparative Example 1 | 1.08 | 100 | 35 | 35 | — | #3003 (30) | 8.3 | 47.8 | 381 | 4.9 | X |

TABLE 1-continued

| | Outer layer | | Intermediate layer (mass %) | | | Heat shrinkage rate (%) | | Degree of tensile | | |
| | Stretching ratio in the machinery direction | (mass %) Polylactic acid | Polylactic acid | | Aliphatic polyester | | Hot water of 80° C. for 10 seconds | | breaking extension | Haze | Appearance after shrinking |
|---|---|---|---|---|---|---|---|---|---|---|---|
| | | | I | II | A | other | MD | TD | % | % | |
| Comparative Example 2 | 1.02 | 100 | 35 | 35 | — | #3003 (30) | 7.2 | 40.5 | 363 | 8.0 | X |
| Comparative Example 3 | 1.01 | 100 | 35 | 35 | — | P-H7 (30) | 8.4 | 72.0 | 279 | 5.9 | X |

1) #1003: BIONOLLE #1003 (manufactured by Showa Highpolymer Co., Ltd. Melting point: 114° C., glass transition temperature: −32° C.)
2) #1010: BIONOLLE #1010 (manufactured by Showa Highpolymer Co., Ltd. Melting point: 115° C., glass transition temperature: −32° C.)
3) PBSL: polybutylene succianate (manufactured by Mitsubishi Chemical Corporation, Melting point: 108° C., glass transition temperature: −30° C.)
4) P-H7: celgreen P-H7 (manufactured by Daicel Chemical Industries, Ltd., Melting point: 61° C., glass transition temperature: −58° C.)
5) #3003: BIONOLLE #3003 (manufactured by Showa Highpolymer Co., Ltd. Melting point: 94° C., glass transition temperature: −45° C.)

As will be apparent from Table 1, heat shrinkable films of Examples 1 to 6 show excellent results in all evaluations such as a heat shrinkage rate, degree of tensile breaking extension, haze and appearance after shrinking. Especially, a laminate film having an outer layer containing 90% by mass or more of polylactic acid-based resin I has small haze and excellent transparency.

On the other hand, heat shrinkable films of Comparative Examples 1 to 3 each shows excess longitudinal shrinkage and failure of appearance after shrinking.

According to the present invention, a heat shrinkable film of polylactic acid-based resin having biodegradability and a good appearance after shrinking can be provided.

INDUSTRIAL APPLICABILITY

A film of polylactic acid-based resin having biodegradability of the present invention is employed for a shrink packaging, a shrink bundling and a shrink label.

What is claimed is:

1. A heat shrinkable film of polylactic acid-based resin, comprising: at least one layer being stretched in at least one direction;
   wherein said layer is formed by using mainly a resin composition which contains polylactic acid-based resin and aliphatic polyester "A" having a melting point of 100 to 140° C. and a glass transition temperature of 0° C. or less, and wherein said resin composition further contains aliphatic polyester "B" having a melting point of 50° C. to 100° C.; and
   wherein a degree of shrinkage in the main shrinkage direction of said heat shrinkable film after performing heat-treatment with hot water at 80° C. for 10 seconds, is 30% or more.

2. The heat shrinkable film of polylactic acid-based resin according to claim 1, wherein said aliphatic polyester "A" has a glass transition temperature of −20° C. or less.

3. The heat shrinkable film of polylactic acid-based resin according to claim 1, wherein said aliphatic polyester "A" has a melt viscosity of MFR (Melt Flow Rate at 190° C.) of 1 to 40.

4. The heat shrinkable film of polylactic acid-based resin according to claim 1, wherein said resin composition contains 50 to 90% by mass of polylactic acid-based resin having a proportion in mass ratio of D-lactic acid to L-lactic acid within the range from 98:2 to 85:15, or from 2:98 to 15:85, and 10 to 40% by mass of aliphatic polyester "A".

5. A heat shrinkable film of polylactic acid-based resin, comprising: at least one layer being stretched in at least one direction;
   wherein said layer is formed by using mainly a resin composition which contains polylactic acid-based resin and aliphatic polyester "A" having a melting point of 100 to 170° C. and a glass transition temperature of 0° C. or less;
   wherein a degree of shrinkage in the main shrinkage direction of said heat shrinkable film, after performing heat-treatment with hot water at 80° C. for 10 seconds, is 30% or more;
   wherein said resin composition contains 50 to 90% by mass of polylactic acid-based resin having a proportion in mass ratio of D-lactic acid to L-lactic acid within the range from 98:2 to 85:15, or from 2:98 to 15:85, and 10 to 40% by mass of aliphatic polyester "A"; and
   wherein said resin composition further contains aliphatic polyester "B" having a melting point of 50° C. to 100° C.

6. The heat shrinkable film of polylactic acid-based resin according to claim 5, wherein said resin composition contains 5 to 20% by mass of said aliphatic polyester "B".

7. The heat shrinkable film of polylactic acid-based resin according to claim 5 comprising an intermediate layer formed by using mainly said resin composition containing mainly polylactic acid-based resin and aliphatic polyester "A," and at least one outer layer containing 90% by mass or more of polylactic acid.

8. A heat shrinkable film of polylactic acid-based resin comprising: an intermediate layer and an outer layer, at least one layer of said film being stretched in at least one direction;
   wherein a degree of shrinkage in the main shrinkage direction of said heat shrinkable film, after performing heat-treatment with hot water at 80° C. for 10 seconds, is 30% or more;
   wherein said intermediate layer is formed by using mainly a resin composition containing mainly polylactic acid-based resin and aliphatic polyester "A" having a melting point of 100 to 170° C. and a glass transition temperature of 0° C. or less;
   wherein said resin composition contains 50 to 90% by mass of polylactic acid-based resin having a proportion in mass ratio of D-lactic acid to L-lactic acid within the range from 98:2 to 85:15, or from 2:98 to 15:85, and 10 to 40% by mass of aliphatic polyester "A"; and wherein said outer layer contains 90% by mass or more of polylactic acid.

9. The heat shrinkable film of polylactic acid-based resin according to claim 8, wherein said outer layer has a thickness of 1 μm or more.

10. A heat shrinkable film of polylactic acid-based resin, comprising: at least one layer being stretched in at least one direction;

wherein said layer is formed by using mainly a resin composition which contains polylactic acid-based resin and aliphatic polyester "A" having a melting point of 100 to 170° C. and a glass transition temperature of 0° C. or less;

wherein a degree of shrinkage in the main shrinkage direction of said heat shrinkable film, after performing heat-treatment with hot water at 80° C. for 10 seconds, is 30% or more; and wherein said resin composition further contains aliphatic polyester "B" having a melting point of 50° C. to 100° C.

11. The heat shrinkable film of polylactic acid-based resin according to claim 10, wherein said resin composition contains 5 to 20% by mass of said aliphatic polyester "B".

12. The heat shrinkable film of polylactic acid-based resin according to claim 10, wherein the degree of longitudinal shrinkage after treating with hot-water at 80° C. for 10 seconds is 7% or less.

13. The heat shrinkable film of polylactic acid-based resin according to claim 10, wherein the degree of longitudinal shrinkage after treating with hot-water at 80° C. for 10 seconds is 5% or less.

14. The heat shrinkable film of polylactic acid-based resin according to claim 10, wherein said aliphatic polyester "A" has a glass transition temperature of −20° C. or less.

15. The heat shrinkable film of polylactic acid-based resin according to claim 10, wherein said aliphatic polyester "A" has a melt viscosity of MFR (Melt Flow Rate at 190° C.) of 1 to 40.

16. A heat shrinkable film of polylactic acid-based resin, comprising: an intermediate layer and an outer layer, at least one layer of said film being stretched in at least one direction;

wherein said intermediate layer is formed by using mainly a resin composition which contains polylactic acid-based resin and aliphatic polyester "A" having a melting point of 100 to 170° C. and a glass transition temperature of 0° C. or less;

wherein a degree of shrinkage in the main shrinkage direction of said heat shrinkable film, after performing heat-treatment with hot water at 80° C. for 10 seconds, is 30% or more; and wherein said outer layer contains 90% by mass or more of polylactic acid.

17. The heat shrinkable film of polylactic acid-based resin according to claim 16, wherein said outer layer has a thickness of 1 μm or more.

18. The heat shrinkable film of polylactic acid-based resin according to claim 16, wherein the degree of longitudinal shrinkage after treating with hot water at 80° C. for 10 seconds is 7% or less.

19. The heat shrinkable film of polylactic acid-based resin according to claim 16, wherein the degree of longitudinal shrinkage after treating with hot water at 80° C. for 10 seconds is 5% or less.

20. The heat shrinkable film of polylactic acid-based resin according to claim 14, wherein said aliphatic polyester "A" has a glass transition temperature of −20° C. or less.

21. The heat shrinkable film of polylactic acid-based resin according to claim 16, wherein said aliphatic polyester "A" has a melt viscosity of MFR (Melt Flow Rate at 190° C.) of 1 to 40.

* * * * *